Dec. 6, 1949
F. W. GREWIN ET AL
2,490,750
METHOD OF REMOVING SCALE
Filed Sept. 15, 1942
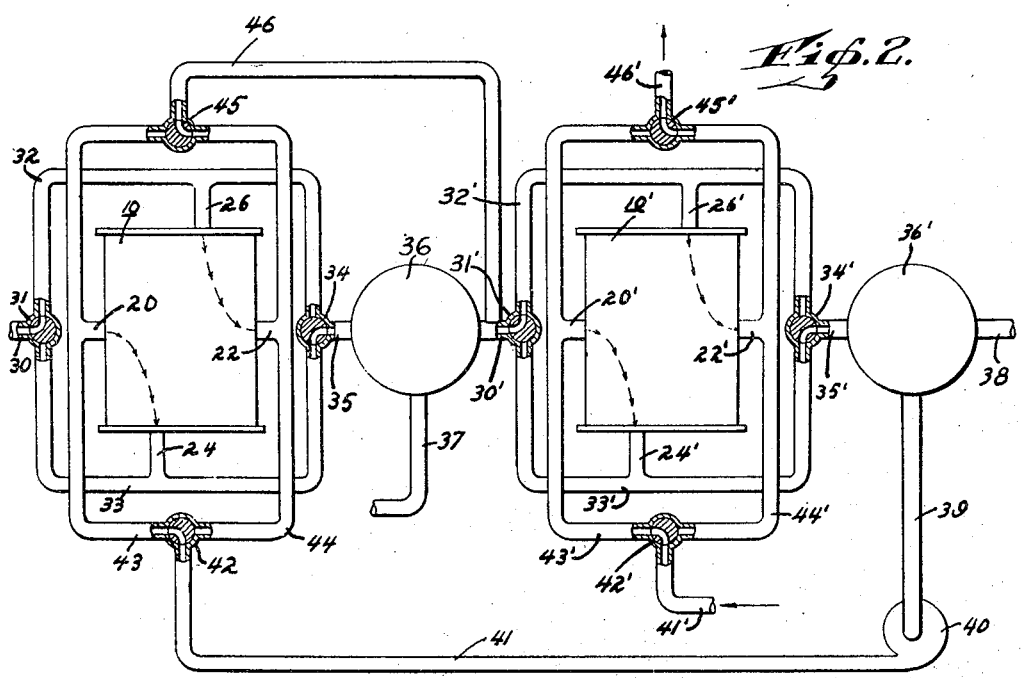

UNITED STATES PATENT OFFICE 2,490,750

METHOD OF REMOVING SCALE

Fredrik Waldemar Grewin, Hallstavik, and Sten Gösta Lindberg, Varmbol, Sweden, assignors, by mesne assignments, to Rosenblad Corporation, New York, N. Y., a corporation of New York Application September 15, 1942, Serial No. 458,470
In Sweden October 9, 1941

5 Claims. (Cl. 159—47)

The present invention relates to methods of effecting indirect heat transfer to solutions which cause scale deposits, such as waste sulphite liquor. It is desirable to heat such liquor in order to evaporate it. The invention pertains to processes where steam is used as a heating medium and two separate channel systems are employed for bringing the solution and steam in heat exchange relation as conducted each through another one of the channel systems.

The difficulties encountered in evaporating solutions of the kind mentioned as examples, depends on their content of calcium salts which tend to form scale on the heat transmitting surfaces, because these incrustations rapidly decrease the efficiency of the heat transferring process and are very hard to remove. Similar conditions prevail on effecting indirect heating of other scale forming solutions, as in the indirect cooking of sulphite pulp and the like, for instance, in which case incrustation of the heat transferring means will occur.

The chief object of the invention is to efficiently and in a simple manner cause rapid removal of the scale formed, before it is grown so thick and compact that the efficiency of the heat transferring process is reduced.

A further object of the invention is to use the saturated steam, which serves as the heating medium, also as means for the removal of scale.

According to the invention the paths of flow of the solution and the steam are altered at suitable intervals so that the channel system which forms the passage for the solution during one period will form the passage for the steam during a following period, and vice versa in alternate succession.

Thus, such alternation of paths should be repeated at intervals which may be considered necessary or suitable in order to attain the removal of the incrustations by the action of the steam and the condensate formed.

Preferably, there should be employed a heat exchange apparatus which is so designed that the channel systems for steam and solution have substantially the same shape and dimensions, this being met by constructions of the spiral type or the plate type, for instance, but naturally also other kinds of heat exchange devices may be useful.

The worst scale-forming component appearing in the evaporation of sulphite waste liquor, for instance, is known to be sulphate of calcium which is only slightly soluble and is an extremely poor heat conductor and is obtained in certain forms with differing contents of crystal water. Depending on temperature conditions, there is precipitated sulphate or calcium with differing contents of crystal water and divergent physical properties. In case a relatively thick deposit of sulphate of calcium is precipitated upon a heat transmitting surface there occurs such a change in the content of crystal water of the layer adjacent to the surface that the solubility materially decreases since the size of the particles also has a great influence on the solubility, it is of the greatest importance that the newly formed deposits may be dissolved at any time, as rendered possible by the present invention. As an example it can be stated that it has been possible to operate a pilot plant with a spiral type heat exchanger for a considerable time while only changing the paths of the fluids at intervals of the order of 30 hours, but still during this time maintaining a constant and very satisfactory heat transmitting efficiency. Further, it has been disclosed that some $SO_2$ gas present in the solution is liberated therefrom and, if mixed with the steam, gives the same an acid character which considerably increase its ability to dissolve the scale.

After each alternation of the channel systems of the heat exchanger, as regards steam and liquor, respectively, the scale deposits are subjected to the dissolving action of the condensate and will be removed together with that condensate. Those incrustations which in the meanwhile will be formed upon the opposite side of the heat transmitting surfaces will be removed in the same manner during the period following the next alternation. In spite thereof that the temperature difference between opposite sides of the surfaces is of the order which is required for attaining a good heat transmitting efficiency, it has been established during the experiments with the pilot plant referred to above that the alternations cause no harmful stresses in the material or any trouble resulting therefrom, nor will there arise any heat losses of practical importance. From the foregoing it is evident that excessively frequent alternations are not required in order to maintain the system in operation without any appreciable decrease of the heat transmitting efficiency, which can be kept practically constant in the manner described.

It is obvious that in the case of evaporation it is not necessary to restrict the number of heat exchangers to a single one but on the contrary it may be suitable for reasons of heat economy to combine according to practices known per se and operate a plurality of such units in series so as to pass the escaping steam or condensate from a unit for carrying out a first stage of evaporation to serve as heating medium in a succeeding unit of the series and so on all through the whole series. In the course of practical experiments with sulphite waste liquor it has been proved that the drop in the temperature of the heating medium as between two successive units of the series can be kept at approximately 15° C. or lower and, if starting with steam of 130° C., for instance, under corresponding pressure as for saturated steam, the process may be carried on down to a temperature of between 60 and 65° C. in the condensate. These figures are, however, given only as an example and the invention is not limited thereby.

An apparatus suitable for carrying out the above described processes is illustrated in the accompanying drawings, in which:

Fig. 1 is a cross-sectional view of a typical spiral plate heat exchanger; and

Fig. 2 is a more or less diagrammatic view of a two-stage system employing two heat exchangers of the type shown in Fig. 1.

Referring more particularly to Fig. 1, reference character 10 designates generally a spiral heat exchanger. It includes a cylindrical casing 11 within which are two spirally wound walls 12 and 13 forming spiral passages 16 and 18 of substantially equal cross-sectional area. Pipe couplings 20 and 22 extend through casing 10 and communicate with the outermost turns of passages 16 and 18, respectively. The inner ends of these two passages communicate with pipe couplings 24 and 26, respectively, formed in opposite end walls of the heat exchanger at opposite sides of a transverse partition wall 28. It will thus be seen that fluid introduced through pipe coupling 20 may flow through spiral passage 16 through the pipe coupling 24, while fluid introduced through the coupling 22 may flow through the spiral passage 18 to the coupling 26, the two fluids being at all times out of contact with each other. Obviously if counterflow is desired, one of the couplings 20 or 22 constitutes an outlet, while one of the couplings 26 or 24, respectively, constitutes an inlet.

In Fig. 2 there is shown a system embodying two heat exchangers 10 and 10', both being of the type illustrated in Fig. 1. A steam supply conduit 30 is connected to a two-way valve 31, to which conduits 32 and 33 are connected. Conduit 32 communicates with the pipe coupling 26 and with a two-way valve 34 which also serves as a pressure reducing valve, while conduit 33 communicates with pipe coupling 24 and the valve 34. This latter valve is also connected by means of a conduit 35 with an evaporator 36 which may consist of a cylindrical vessel. A conduit 37 is connected to the lower part of evaporator 36 and leads to any suitable storage tank.

A conduit 30' communicates with evaporator 36 above the bottom thereof and is connected to a two-way valve 31'. This valve is connected by means of conduits 32' and 33' with pipe couplings 26' and 24', respectively. Conduits 32' and 33' also are connected to a two-way pressure reducing valve 34', which is connected through conduits 35' to an evaporator 36'. A conduit 38 communicates with the latter evaporator above the lower part thereof and may lead to waste. A conduit 39 communicates with the lower part of evaporator 36' and with the inlet of a liquid pump 40. Pump 40 discharges through a conduit 41 to a two-way valve 42. This valve is connected by means of conduits 43 and 44 with pipe couplings 20 and 22, respectively. The conduits 43 and 44 also communicate with a two-way valve 45. This valve is connected by means of a conduit 46 with the conduit 30' evaporator 36 and valve 31.

A liquid supply conduit 41' communicates with a two-way valve 42' which is connected by conduits 43' and 44' with pipe couplings 20' and 22'. Conduits 43' and 44' also communicate with a two-way valve 45', which is connected to a conduit 46' leading to waste.

The foregoing described system may be employed to carry out applicants' invention as follows:

With the various two-way valves set in the positions shown in Fig. 2, steam applied through the conduit 30 passes through the conduit 32 and pipe coupling 26 to within the heat exchanger 10, where it flows through the spiral passage 18 therein and leaves through the pipe coupling 22. From here it flows through the conduit 44, valve 45 and conduit 46 to the conduit 30'. At the same time, liquid from evaporator 36' is supplied under pressure by the pump 40 and flows through conduit 41, valve 42 and conduit 43 to the pipe coupling 20. Thence it flows through the spiral space 16 in heat exchanger 10 and is heated. The hot liquor leaves through the pipe coupling 24 and flows through the conduit 33, valve 34 and conduit 35 to the evaporator 36. The pressure is reduced by valve 34 and consequently a portion of the liquor evaporates in evaporator 36. The vapor thus produced in the evaporator flows therefrom through conduit 30', where it is mixed with the steam and condensate from conduit 46, and the mixture flows through valve 31', conduit 32' and coupling 26' to within the space 18' in heat exchanger 10'. It leaves this space through coupling 22' and thus flows through conduit 44', valve 45' and conduit 46' to waste.

At the same time fresh liquor is introduced through conduit 41', valve 42', conduit 43' and coupling 20' to within space 16' in heat exchanger 10'. It is here heated by the vapors flowing through space 18' and leaves through coupling 24' and flows through conduit 33', valve 34' and conduit 35' to within evaporator 36'. The reduction of pressure effected by valve 34' causes evaporation of a portion of the liquor in evaporator 36'. From here liquid flows through conduit 39 to the pump 40 and is supplied, in the manner above described, to the heat exchanger 10. The vapor introduced into evaporator 36' passes to waste through the conduit 38.

With the valves set in this position the liquor to be heated passes through the passages 16 and 16' in the two heat exchangers with the result that scale will be formed on the walls of this passage. However, this scale may be removed by reversing the valves so that steam will flow through the passages which previously carried liquor while the liquor will flow through the passages which previously carried steam. Thus, if valve 31 is turned so that it connects conduit 30 with conduit 33, steam will flow therethrough and through pipe coupling 24 into spiral passage 18. From this passage the steam flows through the coupling 20 and conduit 43 to valve 45, the position of which has also been changed, and thence through conduit 46 to conduit 30'. At the same time liquor supplied by the pump 40 through conduit 41 will flow through valve 42, the position of which has been changed from that shown in Fig. 2, through a conduit 44 and pipe coupling 22 to the spiral passage 16. The liquor leaves this passage through pipe coupling 26 and flows through conduit 32 and valve 34, the position of which has been changed, and thence through conduit 35 into the evaporator 36.

By changing the positions of the valves in the other stage, the same result may be obtained in the heat exchanger 10'. Consequently, the scale which had previously been formed by the vaporization of the liquor in the heat exchangers is removed by the flow of steam through the passages which formerly carried liquor. It will of course be understood that these valves may be repeatedly reversed at intervals sufficiently close to prevent an undesirable thick accumulation of scale in the heat exchangers.

It will be noted that the heating mechanism employed in heat exchanger 10' is a mixture of steam discharged from heat exchanger 10 and vapor produced in evaporator 36. Such a mixture is much better for removing scale than is pure steam. Inasmuch as the liquor is first heated in heat exchanger 10', more scale will tend to form herein than in heat exchanger 10 and it has been found that pure steam is able to satisfactorily remove the scale from heat exchanger 10.

Thus, what we claim and desire to secure by Letters Patent is:

1. A method of operating a multi-stage evaporating plant including at least two surface heat exchangers connected in series as evaporating units and serving to concentrate a scale forming liquor which contains sulphurous acid and which causes incrustations of calcium sulphate, comprising the steps of passing said liquor in series through the evaporating units on one side of the heat transmitting surface of each while passing a vaporous heating medium on the opposite side of said surface in each unit, withdrawing the hot acid vapors liberated from the liquor in a unit working at a higher temperature, mixing these vapors with the heating medium supplied to the next unit working at a lower temperature, and interchanging the paths of the fluids through any of said units at intervals so that the passage conducting liquor during one period will be conducting the heating medium during a following period to thereby remove said incrustations.

2. A method as set forth in claim 1, which includes utilizing heating medium discharged from a unit working at a higher temperature, together with the vapors liberated from the liquor in the same unit, as heating medium in a unit working at a lower temperature.

3. A method of operating a multi-unit evaporating plant including at least two surface heat exchangers connected as evaporating units and serving to concentrate a liquor of a character tending to deposit scale on the walls of said units comprising the steps of passing said liquor through said evaporating units on one side of the heat transmitting surface of each while passing a fluid heating medium on the opposite side of said surface of each unit, withdrawing the hot vapors liberated from the liquor in one unit, mixing these vapors with a second fluid to provide the heating medium supplied to a second unit, and interchanging the paths of the fluids through any of said units at intervals so that the passage conducting liquor during one period will be conducting the heating medium during a following period to thereby remove said scale.

4. A method of supplying a multi-unit evaporating plant including at least two surface heat exchangers connected as evaporating units for operation at different temperatures and serving to concentrate a liquor of a character tending to deposit scale on the walls of said units comprising the steps of passing said liquor through said evaporating units on one side of the heat transmitting surface of each while passing a fluid heating medium on the opposite side of said surface in each unit, withdrawing the hot vapors liberated from the liquor in the unit working at a higher temperature, mixing these vapors with a second fluid to provide the heating medium supplied to another unit working at a lower temperature and interchanging the paths of the fluids through any of said units at intervals so that the passage conducting liquor during one period will be conducting the heating medium during a following period to thereby remove said scale.

5. A method as set forth in claim 4 which includes utilizing the heating medium discharged from the unit working at a higher temperature together with the vapors liberated from the liquor in the same unit as a heating medium in the unit working at a lower temperature.

FREDRIK WALDEMAR GREWIN.
STEN GÖSTA LINDBERG.

REFERENCES CITED

The following references are of record in the file of this patent:

UNITED STATES PATENTS

| Number | Name | Date |
| --- | --- | --- |
| 779,889 | Todd | Jan. 10, 1905 |
| 1,006,197 | Frasch | Oct. 17, 1911 |
| 1,562,199 | Baumann | Nov. 17, 1925 |
| 2,302,513 | Abraham, Jr. | Nov. 17, 1942 |

FOREIGN PATENTS

| Number | Country | Date |
| --- | --- | --- |
| 481,577 | Great Britain | June 9, 1936 |

OTHER REFERENCES

Handbook of Chemistry by Lange (fifth ed.).